G. C. JENSEN.
BOLT OPERATED LOCKING DEVICE.
APPLICATION FILED DEC. 10, 1918.

1,296,398.

Patented Mar. 4, 1919.

WITNESS
Wm H. Drew

INVENTOR
George C. Jensen
BY
Acker & Totten
ATTORNEYS

UNITED STATES PATENT OFFICE.

GEORGE C. JENSEN, OF OAKLAND, CALIFORNIA.

BOLT-OPERATED LOCKING DEVICE.

1,296,398. Specification of Letters Patent. Patented Mar. 4, 1919.

Application filed December 10, 1918. Serial No. 266,157.

*To all whom it may concern:*

Be it known that I, GEORGE C. JENSEN, a citizen of the United States, residing at Oakland, in the county of Alameda and State of California, have invented certain new and useful Improvements in Bolt-Operated Locking Devices, of which the following is a specification.

In the construction of locking devices for motor vehicles it is necessary that the same be of a type capable of construction and installation at an extremely low cost; consist of but few parts and it is desirable that the locking mechanism have but one removable part, that being the key which is adapted for releasing the bolt locking latch or member.

It is further desirable that a construction be provided consisting of but few parts which in addition to providing a lock for the shift rods or devices is adapted to also provide an interlock for the same whereby one of said rods is locked from operative movement during such time as the other rod is moved from neutral to operative position.

With the above mentioned and other objects in view, the invention consists in the novel construction and combination of parts hereinafter described illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Figure 1:
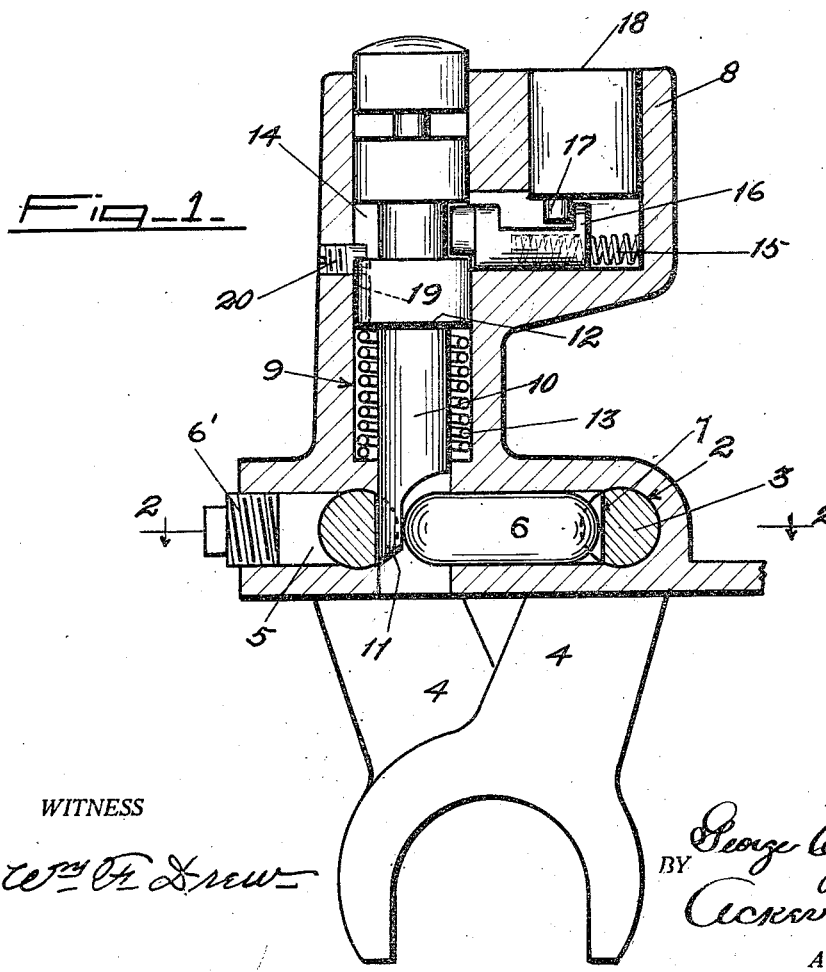

To more fully comprehend the invention reference is directed to the accompanying drawings, wherein, Figure 1 is a vertical sectional view of the preferred embodiment of my invention illustrating the parts in position to lock the shifter rods from operative movement.

Figure 2:
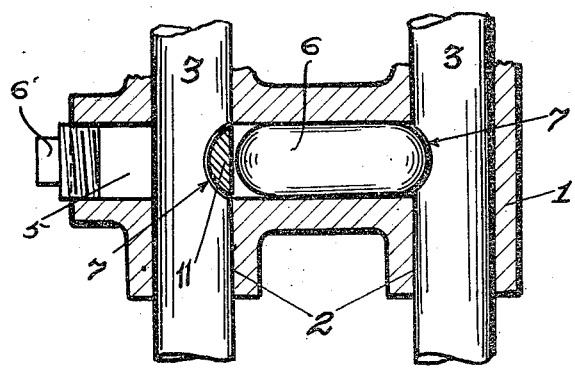

Fig. 2 is a sectional view taken on line 2—2 of Fig. 1 and viewed in the direction of the arrows.

Referring more particularly to the several views of the drawings wherein like characters of reference designate corresponding parts, 1 indicates a suitable member, preferably the end wall or cover of a transmission case housing, although the same may be entirely independent of the transmission case or housing if desired. The member 1 is provided at spaced intervals with the parallel disposed bores or guide openings 2, within each of which is positioned for independent longitudinal sliding movement a shifter rod or device 3, which carry the respective shifter blocks 4 of any well known construction. The member 1 is provided intermediate the length of the bores 2 with a transverse bore 5, intersecting said bores 2, and opening at one end at one side of the member 1, said opening adapted to be closed by a removable plug or member 6'. Positioned within the bore 5 intermediate the shift rods or devices 3 is an elongated interlocking member 6 preferably oval in plan and the same being of a length greater than the distance between said shifter devices 3. The shifter rods or devices 3 are provided on their opposing faces with the stops or recesses 7 adapted preferably when the transmission gears are in neutral position for lying one at each end of the bore 5 between said shifter devices 3, the contour of said stops being similar to the ends of the interlocking member 6. The stops or recesses 7 are of a sufficient depth as to permit one end of the interlocking member 6 to be received within one of said stops during such time as the shifter device at the opposite end of said interlock is moved from neutral position causing the wall surface thereof at either side of said stop for contacting the end of said interlock. It will be apparent that the interlock precludes movement of one rod or shifter device from neutral position during such time as the other rod is in operative or a position which causes the movement of its stop from register with the bore 5.

The member 1 is formed with an upstanding portion 8 having a bore 9 therein adapted at its lower end to intersect one of the bores 2, and within said bore 9 is mounted for reciprocating movement a locking plunger 10, the lower end of which is formed with a locking tongue 11 adapted on the downward movement of the bolt for reception within the stop 7 of the shifter rod or device 3 immediately below the same, said tongue 11 being of a cross-sectional configuration corresponding to the stop or depression 7 and of an area adapted to fill said stop as in Fig. 2 of the drawings, whereby the interlocking member 6 is forced longitudinally and into engagement with the stop 7 of the opposing shifter rod or device 3 thereby locking the same from operative movement. In this construction the tongue 11 coöperating with one of the stops 7 locks one shifter rod or device from movement and forces the interlocking member longitudinally of the bore 5 to engage and lock the other shifter device or member from movement, thus in this construction the member mounted within the bore 5 is capable of movement by the bolt to lock one of said shifter rods or devices from movement, and when the bolt is retracted said member is moved by the operated shifter device or member to interlock or preclude movement of the other shifter device or member until such time as both members are returned to neutral position.

The locking bolt 10 is preferably of a type heretofore disclosed and used in connection with other preferred embodiments of my inventions set forth in numerous patents heretofore granted to me, and for the purposes of illustration the bolt is constructed with the flange 12 between the underside of which and the lower end of the bore 9 is positioned a coiled spring 13 surrounding the bolt, the tension of which normally forces the bolt upwardly to withdraw the tongue 11 thereof from within its coöperating stop 7. The bolt is also provided with a pawl receiving recess 14 into which is adapted to be projected by the spring 15 the locking pawl 16 of any suitable type and adapted to be released or withdrawn by the operation of the eccentric end 17 of a key-operated locking barrel 18 of any well known construction preferably of the type set forth in copending application Serial No. 250,656 filed Aug. 20, 1918. The upper end of the locking bolt 10 is adapted to project above the upper end of the bore 9 and said projecting end affords a means for engaging the bolt to force the same downwardly into locked position as in Fig. 1 of the drawings. To prevent the bolt rotating the same is provided with a vertical guide or slot 19 into which projects the inner end of the guide screw 20.

In my present device it will be apparent that I provide through the tongue 11 and member 6, means whereby both rods or shifter devices 3 may be locked from movement, and also provide when the tongue is withdrawn a means whereby one of the rods or shifter devices is locked from movement during such time as the other is moved from neutral position.

By the present construction I dispense with one of the members necessary when the locking member or bolt is disposed centrally between the shifter rods or devices 3 and one locking member is positioned at each side thereof for respectively engaging one of said rods or shifter devices.

It is apparent that by reducing the length of the member 6, the interlocking feature may be dispensed with, and the device may be solely employed for locking the shifter devices from movement, but it is to be understood that if the length of the member 6 is reduced, the thickness, width or contour of the tongue 11 must be varied from that illustrated in the disclosure, as said tongue must be necessarily of a suitable confirmation to force the opposite end of the member 6 into coöperation with one of said stops when the tongue coöperates with its associated stop.

Having thus described my invention, what I claim as new and desire to protect by Letters Patent is:—

1. The combination with a plurality of longitudinally movable shifter devices, each provided with a stop, a movable locking bolt adapted when in locking position to engage with the stop of one of the shifter devices, and a disengageable member actuated by said bolt when moved into locking position for engaging the stop of the opposing shifter device, whereby the said devices are held locked against longitudinal movement, and lock controlled means for locking the said bolt when moved to locking position.

2. In combination with a pair of spaced independently movable shifter devices, each provided with a stop, a lock controlled locking bolt capable of movement for engaging one of said shifter devices to lock the same from operative movement, and a member interposed between said shifter devices and moved by said bolt when in its latter position into coöperation with the stop of the other shifter device to lock the same from movement.

3. In combination with a pair of spaced independently movable shifter devices, each provided with a stop, a lock controlled locking bolt capable of movement for engaging one of said shifter devices to lock the same from operative movement, and interlocking means interposed between said shifter devices and capable of coöperation with the stop of one shifter device on the movement of the other shifter device to move its stop from coöperation with the end of said interlocking member, said bolt adapted on its movement into coöperative relation with its associated stop to force said interlocking means into locked engagement with the other shifter device.

4. In combination with a pair of independently movable shifter devices, each provided with a recess, an interlocking member freely movable between said shifter devices and the ends thereof adapted for reception within said stops, said member being of a length approximately equal to the distance between said rods and the depth of one stop, and a lock controlled locking bolt independent of said interlocking member and adapted for movement into the recess of one of said shifter devices for locking the same from movement and for filling said stop, whereby the opposite end of said interlocking member is forced thereby into coöperation with the stop of the other shifter device to lock the same from movement.

5. In combination with a pair of parallel spaced independently movable shifter devices, each provided with a stop, a longitudinally movable locking bolt capable of movement to coöperate with the stop of one of said shifter devices to lock the device from movement, and a member interposed between said shifter devices and freely movable, said member adapted for movement by said bolt when in its latter position into coöperation with the stop of the other shifter device to lock the same from movement.

6. A means for simultaneously locking two spaced longitudinal members from movement, the same comprising freely movable means positioned between said members and adapted for coöperation at one end with one of said members, and a plunger member capable of longitudinal movement into coöperation with one of said longitudinally movable members to lock the same from movement and with said freely movable means, whereby one of said longitudinally movable members is locked from movement by said plunger member and the said freely movable means is forced into coöperation with the other member by said plunger and locks the said other longitudinal movable member from movement.

In testimony whereof I have signed my name to this specification in the presence of a subscribing witness.

GEORGE C. JENSEN.

Witness:
D. B. RICHARDS.